(12) United States Patent
Pierce et al.

(10) Patent No.: US 7,503,414 B2
(45) Date of Patent: Mar. 17, 2009

(54) MOVABLE SUBFRAME FOR TRACTOR-TRAILERS

(75) Inventors: Phillippi R. Pierce, Canton, OH (US); Kimm L. Carr, Canton, OH (US); Greg Copeland, Massillon, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 308 days.

(21) Appl. No.: 11/476,486

(22) Filed: Jun. 28, 2006

(65) Prior Publication Data

US 2007/0001421 A1 Jan. 4, 2007

Related U.S. Application Data (60) Provisional application No. 60/695,268, filed on Jun. 30, 2005.

(51) Int. Cl.
*B62D 61/00* (2006.01)
(52) U.S. Cl. .................. 180/209; 280/149.2; 180/24.02
(58) Field of Classification Search .................. 180/209, 180/24.02, 271, 286; 280/149.2, 432
See application file for complete search history.

(56) References Cited

U.S. PATENT DOCUMENTS

| | | | |
|---|---|---|---|
| 3,317,219 A * | 5/1967 | Hindin et al. .................. 410/53 |
| 4,790,574 A | 12/1988 | Wagner et al. | |
| 5,013,193 A * | 5/1991 | Rabo et al. ................... 408/201 |
| 5,642,896 A | 7/1997 | Pierce et al. | |
| 5,720,489 A | 2/1998 | Pierce et al. | |
| 6,108,862 A * | 8/2000 | Frederick et al. ........... 15/340.2 |
| 6,120,207 A | 9/2000 | Goto | |
| 6,240,806 B1 * | 6/2001 | Morris et al. .................. 74/567 |
| 6,485,054 B1 | 11/2002 | Yurgevich | |
| 6,708,588 B2 * | 3/2004 | Kesinger et al. .............. 81/380 |
| 2007/0075471 A1 * | 4/2007 | Kuehnle et al. ............. 267/155 |

* cited by examiner

*Primary Examiner*—John Q. Nguyen
*Assistant Examiner*—Nicole Verley
(74) *Attorney, Agent, or Firm*—Krugliak, Wilkins, Griffiths & Dougherty Co., L.P.A.; David P. Dureska; Brent L. Moore (57) ABSTRACT

A movable subframe for a tractor-trailer includes a pair of elongated spaced-apart main members extending longitudinally relative to the tractor-trailer, at least one cross member extending between and being attached to the main members, and a retractable pin mechanism for selectively securing the position of the subframe relative to a body of the tractor-trailer. At least one of the main members includes at least one opening for receiving a pin of the retractable pin mechanism. The main member opening is formed in a shape, such as a D-shape, which reduces or minimizes distortion of the main member adjacent the top of the opening that is associated with forming of the main member.

9 Claims, 6 Drawing Sheets

MOVABLE SUBFRAME FOR TRACTOR-TRAILERS

CROSS-REFERENCE TO RELATED APPLICATION

This application claims the benefit of U.S. Provisional Patent Application Ser. No. 60/695,268, filed on Jun. 30, 2005.

BACKGROUND OF THE INVENTION

1. Technical Field

The invention relates generally to subframes for heavy-duty vehicles, such as tractor-trailers, and in particular to movable subframes for tractor-trailers. More particularly, the invention is directed to a movable subframe for tractor-trailers which includes a pair of main members formed with openings for receiving pins of a retractable pin mechanism, for locking the movable subframe in a selected position relative to the tractor-trailer body. Still more particularly, the invention relates to a movable subframe for tractor-trailers in which each one of the main member openings is shaped in a manner that minimizes undesirable distortion of the main members adjacent the upper portion of the openings.

2. Background Art

Movable subframes, typically referred to as slider boxes, slider subframes, slider undercarriages, or slider secondary frames, have been utilized on heavy-duty vehicles such as tractor-trailers or semi-trailers for many years. One or more axle/suspension systems usually are suspended from a single slider box. For purposes of clarity, hereinafter the present invention will be referred to as a slider box. It is understood that a slider box outfitted with usually two axle/suspension systems typically is referred to as a slider or slider tandem, and again, for purposes of clarity will hereinafter be referred to as a slider tandem. Of course, as mentioned above, a slider box may also be outfitted with a single axle/suspension system, or three or more axle/suspension systems. Reference herein shall be made to a slider tandem by way of example, with the understanding that such reference applies to a slider outfitted with one, two, three or more axle/suspension systems. The slider tandem in turn is mounted on the underside of the trailer frame, and is movable longitudinally therealong to provide a means for variable load distribution and vehicular maneuverability.

More specifically, the amount of cargo that a trailer may carry is governed by local, state and/or national road and bridge laws, and is dependent on proper load distribution. The basic principle behind most road and bridge laws is to limit the maximum load that a vehicle may carry, as well as limit the maximum load that can be supported by individual axles. A trailer having a slider tandem gains an advantage with respect to laws governing maximum axle loads. More particularly, proper placement of the slider tandem varies individual axle loads or redistributes the trailer load so that it is within legal limits.

Once properly positioned, the slider tandem is locked in place on the underside of the trailer by a retractable pin mechanism. The retractable pin mechanism generally includes two or more, and typically four, retractable pins which may be interconnected by a crank mechanism. When the pins are in their extended position, they each extend through a respective opening formed in the main members of the slider box and a selected aligned one of a plurality of openings formed in rails of the trailer body. The pins thereby lock the slider box in a selected position relative to the trailer body.

The prior art openings formed in the main members of the slider box for receiving the retractable pins typically are round, or circular, which leads to certain disadvantages. More particularly, the openings are formed in a flat sheet or plate of metal such as steel, which is then bent into a usually C-shaped cross section to form one of the main members of the slider box. The openings are located near the upper bend of the C-shaped cross section, which causes undesirable distortion of the slider box main member at the top of the openings, because the portion of the main member at the top of each opening does not form properly with the curvature of the bend radius. This distortion interferes with the selective movement of the slider box main members relative to the trailer frame rails. When lower-strength materials are used for the slider box main members, the distortion is minimal because these materials generally allow a small bend radius at the upper bend. However, when higher strength materials are used as is typical, a larger bend radius is required to form the C-shaped cross section of the slider box main member, leading to greater distortion of the member at the top of the openings. This increased distortion leads to a significant interference of the selective movement of the slider box main members relative to the trailer frame rails, which requires a post-forming operation to alleviate, such as grinding of the main members at the distortion. The grinding operation increases the time and effort required to produce a slider box that is capable of being repositioned relatively easily.

As a result, a need has existed in the art to develop a slider box including main members with pin openings that reduce or eliminate the distortion that occurs in the main members at the top of each respective opening, particularly when higher strength materials are used. The present invention satisfies this need, providing a slider box including main members with openings that are shaped to minimize such undesirable distortion.

SUMMARY OF THE INVENTION

An objective of the present invention is to provide a slider box having main members with reduced distortion at the top of each respective retractable pin opening.

Another objective of the present invention is to provide a slider box that reduces post-forming operations, particularly when high-strength materials are used for the slider box main members.

Yet another objective of the present invention is to provide a slider box that is easily repositioned through smooth selective movement of the slider box relative to the trailer frame rails.

These objectives and advantages are obtained by the slider box for a tractor-trailer of the present invention, which includes a pair of transversely spaced-apart main members extending longitudinally relative to the tractor-trailer, at least one cross member extending between and being attached to the main members, and a retractable pin mechanism for selectively positioning the subframe relative to a body of the tractor-trailer. At least one of the main members is formed with at least one opening for receiving a pin of the retractable pin mechanism. The opening having a shape whereby distortion of the main member adjacent the top of the opening is reduced during formation of the main member.

BRIEF DESCRIPTION OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
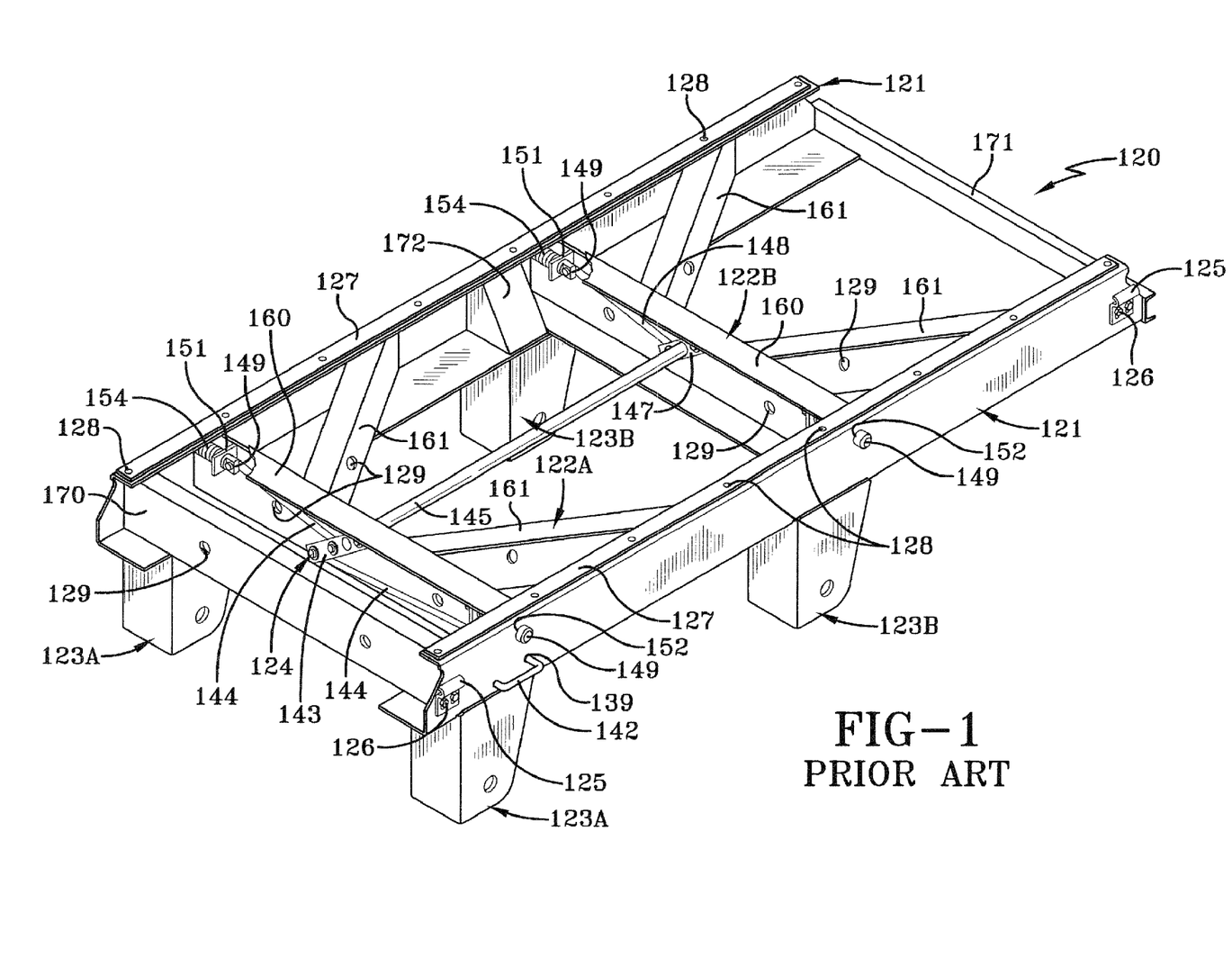
FIG. 1 is a driver's-side top front fragmentary perspective view of a prior art slider box for a tractor-trailer, showing the retractable pin mechanism used to selectively position the slider box along the underside of a trailer body, and further showing depending hangers for suspending axle/suspension systems from the slider box.

In order to better understand the slider box of the present invention, a prior art slider box for a tractor-trailer is shown in FIG. 1, is indicated generally at 120, and now will be described. Slider box 120 includes a pair of main members 121, front and rear generally K-shaped cross member structures 122A and 122B, respectively, and a retractable pin mechanism 124. Front and rear pairs of hangers 123A and 123B, respectively, are attached to and depend from slider box 120 for suspending axle/suspension systems. It is important to note that reference to slider box 120 includes other styles of slider boxes known in the art, such as perpendicular-frame slider boxes, and slider boxes suspending other types of suspension systems, such as spring suspensions. For the sake of clarity, reference hereinbelow will be made to slider box 120 with the understanding that such reference generally includes all types of slider boxes known to those skilled in the art, and that the present invention slider box and in particular its generally D-shaped locking pin openings and correspondingly-shaped pins can find application in all such prior art slider box designs.

With continuing reference to FIG. 1, each main member 121 is an elongated, generally C-shaped beam made of a metal such as steel or other suitably robust material. The open portion of each main member 121 is opposed to the open portion of the other main member and faces inboard relative to slider box 120. Main members 121 are connected to each other in a spaced-apart parallel relationship by K-shaped cross member structures 122A,B, front reinforcing cross member 170 and optional reinforcement bar 171.

Each K-shaped cross member structure 122 includes a base member 160 which extends between and is perpendicular to main members 121. Each base member 160 is a generally C-shaped beam made of a metal such as steel or other suitably robust material. The open portion of each base member 160 faces in a frontward direction relative to the vehicle. Each end of base member 160 nests in the open portion of a respective one of main members 121, and is secured therein by any suitable means such as welding or mechanical fastening. Each one of a pair of front hangers 123A is attached by welding or other suitable means, to the lowermost surface of a respective one of main members 121 at a location directly beneath base member 160 of front K-shaped cross member structure 122A. Each one of a pair of rear hangers 123B similarly is attached by welding or other suitable means to the lowermost surface of a respective one of main members 121 at a location directly beneath base member 160 of rear K-shaped cross member structure 122B.

Each K-shaped cross member structure 122 further includes a pair of inclined, angled, or diagonal members 161, each of which is a generally C-shaped beam also made of a metal such as steel or other suitable material. The open portion of each diagonal member 161 faces in an outboard-frontward direction relative to the operating vehicle, and each of the diagonal members extends between generally the middle portion of base member 160 and a respective one of main members 121. The front end of each diagonal member 161 is attached to the rearwardmost surface of base member 160 at an angle by any suitable means such as welding or mechanical fastening, and the rear end of each of the diagonal members is nested at an angle in the open portion of a respective one of main members 121, and also is attached thereto by any suitable means such as welding or mechanical fastening. Thus, it can be seen that base member 160 and diagonal members 161 form an integral K-shaped cross member structure 122 which interconnects and maintains main members 121 in a spaced-apart, parallel relationship.

A front reinforcing cross member 170 is disposed frontwardly of retractable pin mechanism 124, and extends between and is perpendicular to main members 121. Front reinforcing cross member 170 is a generally C-shaped beam made of a metal such as steel or other suitable material, the open portion of which faces in a rearward direction. Each end of front reinforcing member 170 nests in the open portion of a respective one of main members 121, and is secured therein by any suitable means such as welding or mechanical fastening. An optional reinforcement bar 171, which extends between the rearwardmost ends of main members 121, is also a generally C-shaped beam made of a metal such as steel or other suitably robust material, the open portion of which also faces in a rearward direction, adds additional strength to the structure, and is attached thereto by any suitable means such as welding or mechanical fasteners.

One or more openings 129 are formed in the vertically extending surface of front reinforcing cross member 170, each base member 160 and each diagonal member 161, and each of the openings 129 is aligned with the corresponding openings formed in the other members to provide for passage of air and/or fluid conduits, electrical lines, and the like used in the operation of the tractor-trailer (not shown).

Each main member 121 has a pair of rail guides 125 mounted on its outboard surface by bolts 126, or other suitable means of attachment, such as welding. Each rail guide 125 is mounted adjacent to a respective one of the ends of main member 121. A low friction strip 127 is attached to the uppermost surface of each main member 121 by recessed fasteners 128, and extends generally the entire length of main member 121. Low friction strip 127 is formed of any suitable low friction material, such as ultra-high molecular weight polyethylene.

Figure 2:
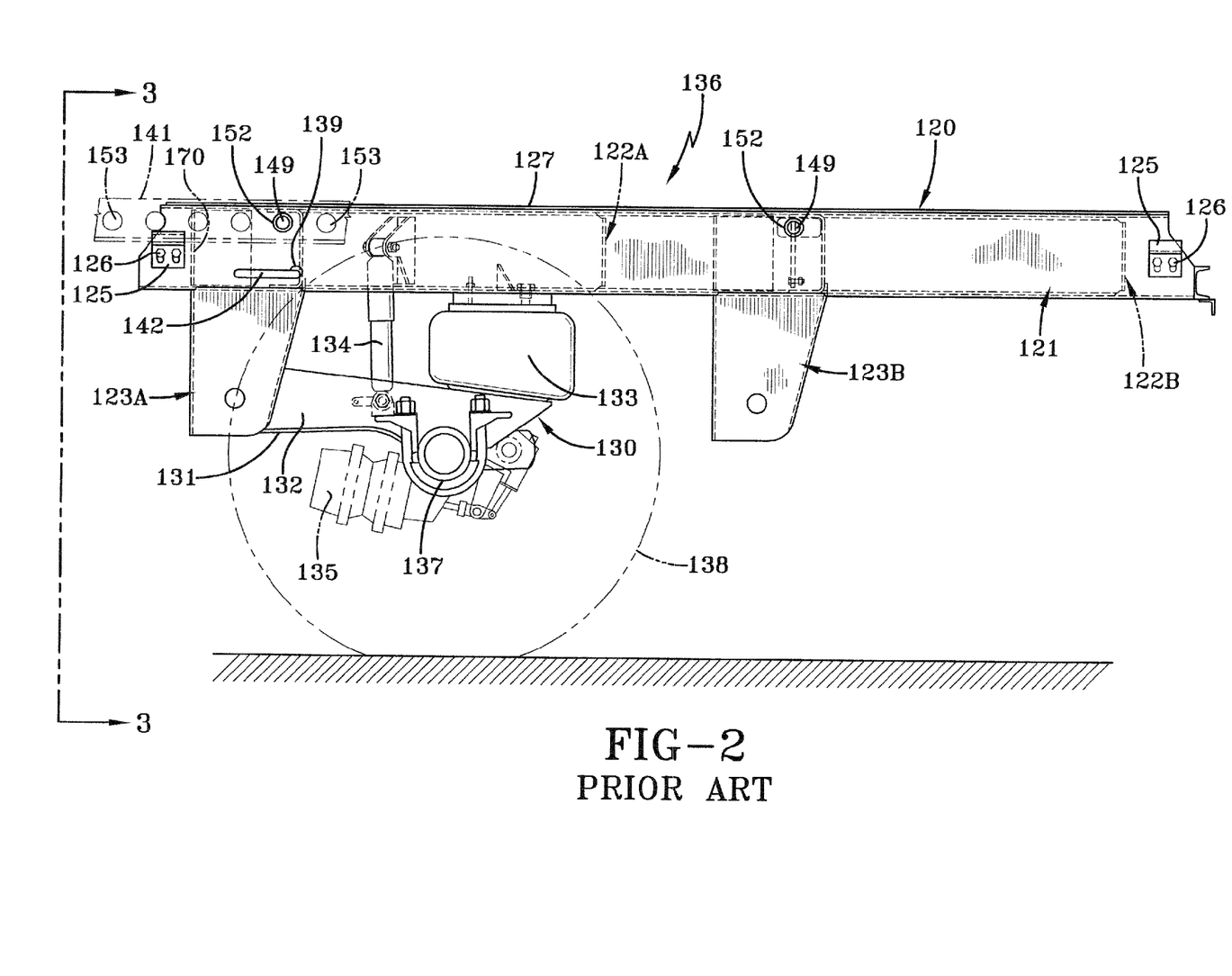
FIG. 2 is an enlarged fragmentary driver's-side elevational view of a prior art slider tandem, including the prior art slider box shown in FIG. 1, and showing one of two axle/suspension systems, with hidden portions represented by broken lines.

As mentioned hereinabove, and as best shown in FIG. 2, prior art slider box 120 supports front and rear axle/suspension systems, forming a slider tandem 136. However, only front axle/suspension system 130 is shown in the drawings and described herein since the front and rear systems are identical in structure and operation. Moreover, inasmuch as axle/suspension system 130 is suspended from slider box 120, but does not form an integral part thereof, only the major components of the system will be cited for aiding in the description of the environment in which the prior art slider box operates.

Axle/suspension system 130 includes generally identical suspension assemblies 131 suspended from each one of a pair of front hangers 123A. A reinforcement member 172 (FIG. 1) is mounted by any suitable means in the open portion of each main member 121 frontwardly of and adjacent to each end of rearward base member 160 and directly above rearward hanger 123B, to provide additional strength to slider box 120 for supporting the rear hanger and its associated suspension assembly (not shown). Each suspension assembly 131 includes a suspension beam 132 which is pivotally mounted on hanger 123A in a usual manner as known in the art. An air spring 133 is suitably mounted on and extends between the upper surface of the rearwardmost end of suspension beam 132 and main member 121 at a location directly beneath the outboard end of a respective one of diagonal members 161 of K-shaped cross member structure 122A. A shock absorber 134 extends between and is mounted on suspension beam 132 and the respective diagonal member 161. For the sake of relative completeness, an air chamber 135 of a brake system is shown mounted on suspension assembly 131. An axle 137 extends between and is captured in the pair of suspension beams 132 of axle/suspension system 130. One or more wheels 138 are mounted on each end of axle 137.

Slider tandem 136 is movably mounted on the trailer body 140 (FIGS. 3-4) by slidable engagement of rail guides 125 with spaced apart, parallel and generally Z-shaped trailer mounting rails 141, which are mounted on and depend from the underside of the trailer body. Each low friction strip 127 abuts the bottom surface of the uppermost portion of a respective one of trailer mounting rails 141 to provide a smooth, generally friction-free contact surface for slidable movement of slider tandem 136 on trailer body 140.

Figure 3:
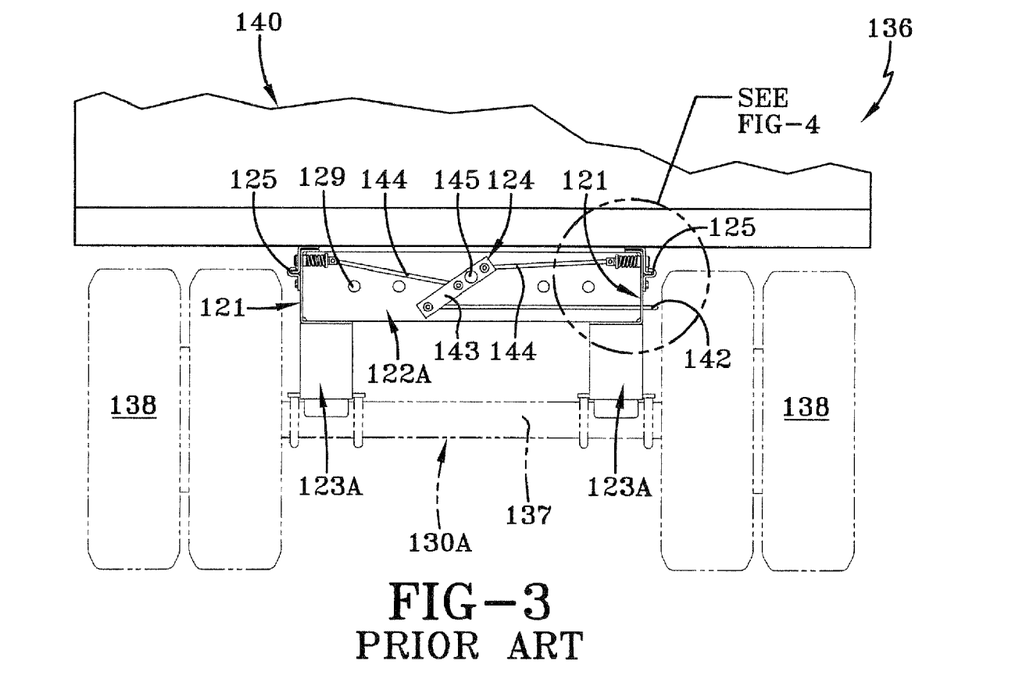
FIG. 3 is a reduced-size fragmentary view looking in the direction of lines 3-3 of FIG. 2, with portions thereof represented by broken lines, and showing the prior art slider tandem of FIG. 2 movably mounted on the underside of a trailer body, with the front reinforcing cross member of the slider box of the slider tandem removed.

Slider tandem 136 can be selectively positioned relative to trailer body 140 for optimum load distribution by retractable pin mechanism 124. As best shown in FIGS. 1 and 3, retractable pin mechanism 124 includes a generally L-shaped handle 142 which passes through an opening 139 formed in a selected one of main members 121, but usually on the driver's side of the tractor trailer. It can be seen that the bent end portion of handle 142, which extends outwardly from the outboard side of main member 121, is accessible for easy grasping by an operator of the tractor-trailer. The inboard end of handle 142 is pivotally attached to a lever 143, which in turn is pivotally attached to a pair of arms 144 which extend in opposite outboard directions from lever 143. Lever 143 further is attached to an elongated pivot rod 145 which passes rearwardly through an opening (not shown) formed in base member 160 of front K-shaped cross member structure 122A. The end of pivot rod 145 remote from lever 143 similarly is attached to a remote lever 147, which in turn is pivotally attached to a pair of arms 148 which extend in opposite outboard directions from remote lever 147. The outboard end of each of arms 144, 148 is bent and is pivotally attached to the inboard end of a locking pin 149.

Figure 4:
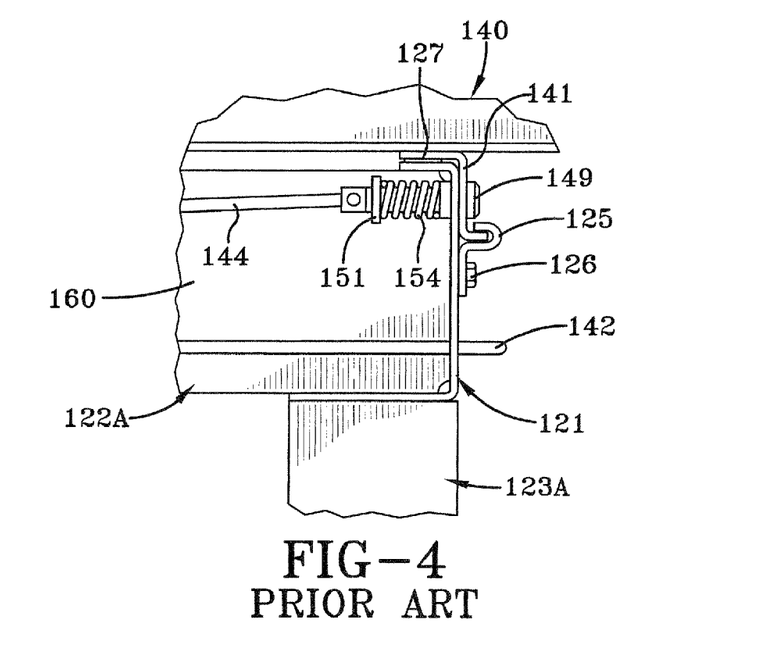
FIG. 4 is a greatly-enlarged fragmentary view taken from the circled area in FIG. 3, showing one of the pins of the retractable pin mechanism in the locked position.

Referring now to FIGS. 1 and 4, the inboard end of each locking pin 149 is slidably mounted in an opening (not shown) formed in a bracket 151 which is attached by suitable means such as welding to a respective one of base members 160. The enlarged outboard end of each locking pin 149 extends through a generally round or circular-shaped opening 152 (FIG. 2) formed in a respective one of main members 121. When it is desired to lock slider tandem 136 in a selected position relative to trailer body 140, the slider box main member openings 152 are aligned with selected ones of a plurality of correspondingly-sized and shaped openings 153 formed in trailer mounting rails 141 of the trailer body (FIG. 2). Each locking pin 149 automatically extends through the selected aligned openings 152, 153 since the pin is biased in an outboard direction by a coil spring 154 captured between bracket 151 and the enlarged outboard end of locking pin 149. When it is again desired by the operator of the tractor-trailer to move slider tandem 136 beneath trailer body 140, the parking brake of the trailer is engaged, handle 142 is pulled in an outboard direction to retract locking pins 149 out of trailer rail openings 153, and slider tandem 136 is moved longitudinally along trailer mounting rails 141 until slider box main member openings 152 align with selected trailer rail openings 153 and locking pins 149 engage therewith as described hereinabove for maximizing load distribution.

One of the advantages of using a slider tandem, such as slider tandem 136, on a tractor trailer is the relative ease with which the slider tandem can be moved, enabling convenient redistribution of the trailer load. This advantage, however, is in part dependent upon the smooth movement of slider box main members 121 relative to corresponding trailer mounting rails 141 when locking pins 149 are in a retracted position. One factor that reduces the smooth selective movement of slider box main members 121 is distortion of the slider box main members at main member openings 152.

This distortion occurs when slider box main member 121 is formed. More specifically, slider box main member 121 begins as a generally flat sheet or plate of steel or other suitable robust material. Standard processing and tooling techniques dictate that slider box main member openings 152 are formed in the flat sheet or plate, and the flat sheet or plate then is bent into the generally C-shaped cross section of slider box main member 121, as shown in FIG. 1. Prior art openings 152 are round or circular and are located near the upper bend of formed slider box main member 121, due to space requirements for retractable pin mechanism 124 and other design considerations which are well known to those of ordinary skill in the art. This location of main member openings 152, however, causes some undesirable distortion of the vertical wall of slider box main member 121 at the top of the openings during the bending step, since the portion of the main member at the top of each opening does not form with the curvature of the bend radius. More specifically, the upper portion of the main member openings 152 bulges generally outboardly as a result of the bending step. This outboard distortion can interfere with the smooth selective movement of slider box main members 121 relative to corresponding trailer mounting rails 141.

When lower-strength materials, such as lower-strength grades of steel, are used for slider box main members 121, the distortion of the vertical wall of the main members at the top of main member openings 152 is minimal because these lower-strength materials generally allow for a smaller bend radius at the upper bend, creating a somewhat negligible reduction of the smooth selective movement of the slider box main members relative to corresponding trailer mounting rails 141. However, when higher-strength materials, such as high-strength grades of steel or metal alloys, are used which is typical, the distortion is greater because these materials generally require a larger bend radius at the upper bend, and that distortion leads to a significant reduction in the smooth selective movement of slider box main members 121 relative to corresponding trailer mounting rails 141. More particularly, higher strength materials require a larger radius for each bend that is formed in slider box main member 121 to give the member its C-shaped cross section. With an increased bend radius, the top of slider box main member opening 152 becomes closer to the bend, creating more distortion of the vertical wall of slider box main member 121 at the top of the opening.

As mentioned above, design considerations, such as the amount of space needed to enable proper functioning of lever 143, arms 144 and locking pins 149 of retractable pin mechanism 124, prevent relocation of slider box main member openings 152. Therefore, to facilitate smooth selective movement of slider box main members 121 relative to corresponding trailer mounting rails 141 when significant distortion of the slider box main members occurs, the members must be ground generally flat in the area of the distortion. The grinding operation is an additional process step that increases the time and effort required to produce a slider box 120 that will reposition relatively easily and minimize such interference between slider box main members 121 and corresponding trailer mounting rails 141.

As a result, a need has existed in the art to develop a slider box that reduces or eliminates the distortion that occurs in the wall of the main member at the top of each respective opening, particularly when higher strength materials are used. The present invention satisfies this need, providing a slider box that minimizes such undesirable distortion in the wall of the main member at the top of the respective openings.

Figure 5:
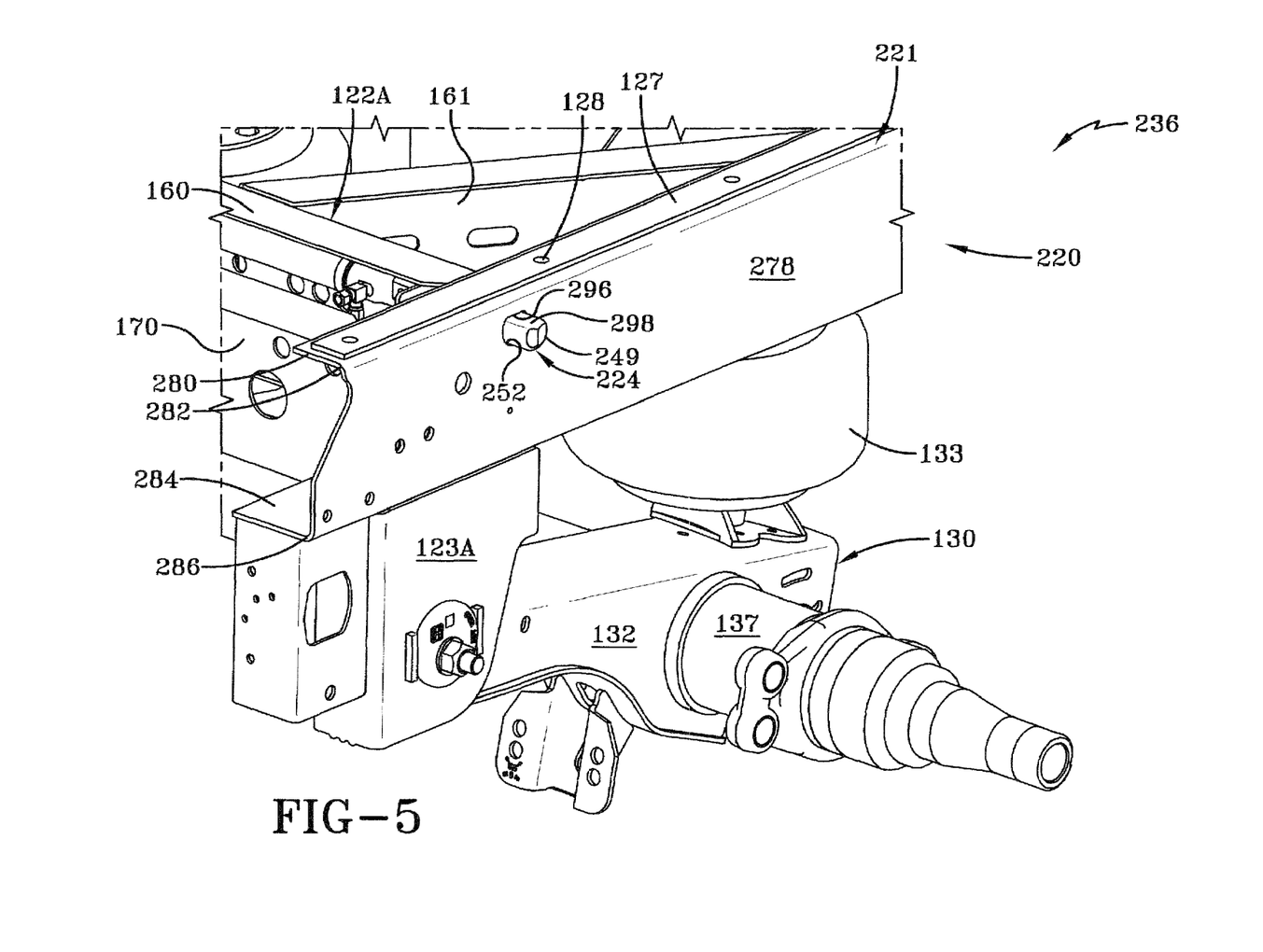
FIG. 5 is a driver's-side fragmentary perspective view of a slider tandem for a tractor-trailer, including the slider box of the present invention, and showing one of the main member openings and one of the correspondingly-shaped locking pins of the retractable pin mechanism extending through the main member opening in a locked position.
Figure 6:
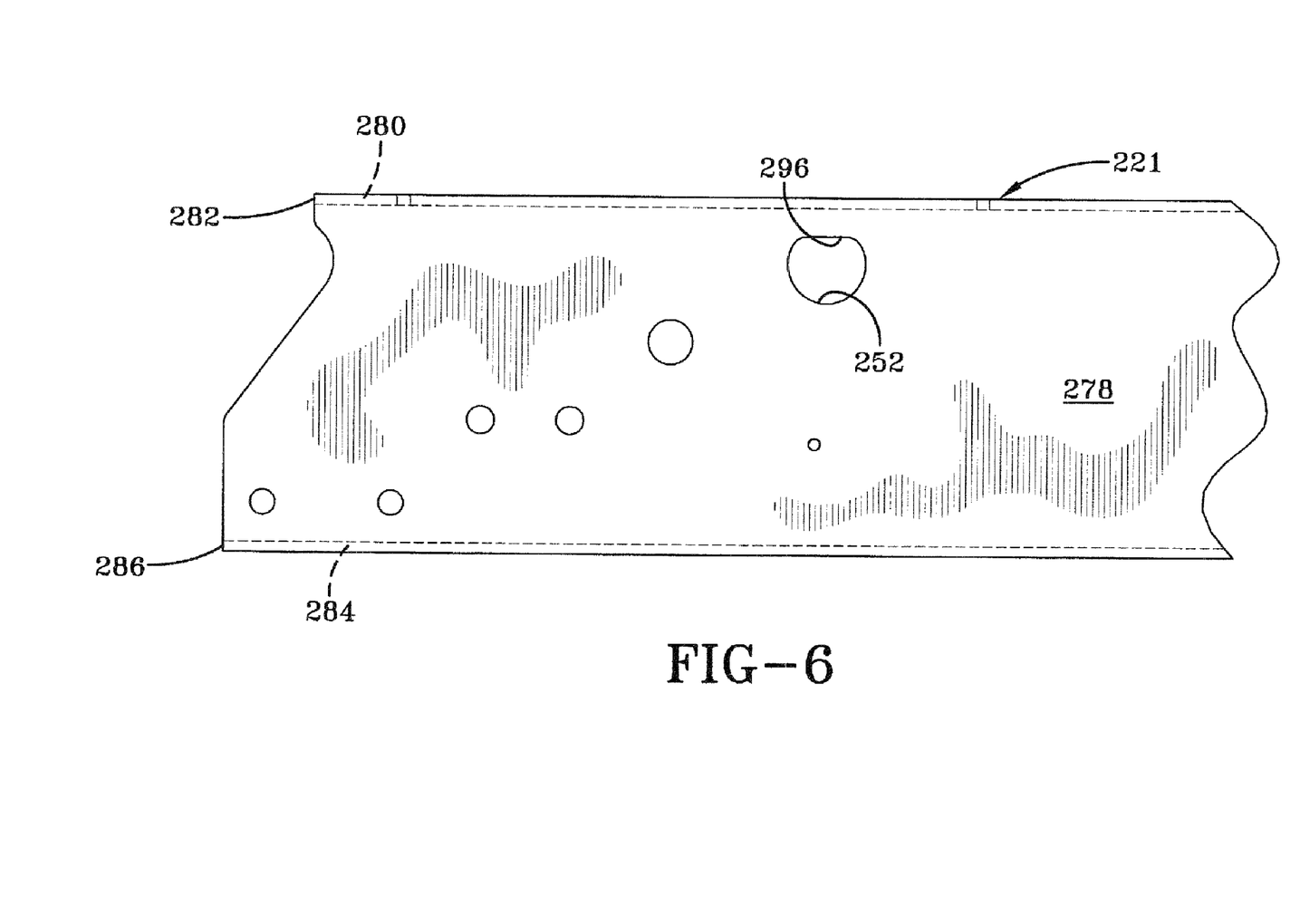
FIG. 6 is a fragmentary driver's side elevational view of a main member of the slider box shown in FIG. 5, showing one of the main member openings, with hidden portions represented by broken lines.

As will be described in greater detail immediately below, the preferred embodiment of the present invention contemplates a slider box with components identical or similar to those of any of the various prior art slider boxes, including slider box 120 shown in FIGS. 1-4, with the only difference being a main member having D-shaped locking pin openings, thereby reducing or eliminating the distortion of the slider box main member at the openings that occurs during member formation. Turning now to the drawings of the present invention, wherein the illustrations are for showing a preferred embodiment of the invention, and not for limiting the same, FIG. 5 shows a slider tandem, indicated generally at 236, which includes a slider box of the present invention, indicated generally at 220, and FIG. 6 shows a main member 221 of the slider box. Only the differences between slider box 220 of the present invention and prior art slider box 120 now will be described.

Formed slider box main member 221 includes a C-shaped cross section, including a vertically-disposed wall 278 that transitions to a horizontally-inboardly extending upper wall 280 via an upper bend 282, and a horizontally-inboardly extending lower wall 284 that transitions from the vertical wall via a lower bend 286. Formed in vertically-disposed wall 278 is a generally D-shaped opening 252, through which a locking pin 249 of a retractable pin mechanism 224 extends, in the manner described above. Aside from D-shaped opening 252 and locking pin 249, all other components of pin mechanism 224 are identical to those of retractable pin mechanism 124 of prior art slider box 120.

More specifically, D-shaped opening 252 includes a flat top 296 corresponding to the flat portion of the D-shape, which is disposed horizontally adjacent to the top of vertically-disposed wall 278, proximate upper bend 282. In this manner, the location of D-shaped opening 252 at the top of vertically-disposed wall 278 is maintained, while distortion of slider box main member 221 at the respective top of each D-shaped opening 252 is reduced or minimized relative to prior art slider boxes. More particularly, the use of D-shaped openings 252 with respective flat tops 296 increases the distance between the respective tops of the openings and upper bend 282, as compared to the distance between the respective top portions of round prior art main member openings 152 (FIG. 1) and the upper bend, without changing the location of the openings, the latter of which is desirable due to the design considerations discussed hereinabove. Thus, by increasing the distance between the top of openings 252 and upper bend 282, the distortion of slider box main member 221 caused by the presence of the opening when the upper bend is formed is reduced or minimized.

In addition, higher-strength materials, such as certain high-strength grades of steel, aluminum, alloys thereof and other materials, require a larger bend radius for the formation of upper bend 282. By increasing the effective distance between the top of opening 252 and upper bend 282, such a larger bend radius may be employed without a significant increase in distortion of slider box main member 221 at the opening. As a result, slider box 220 may use higher-strength materials without undesirably increasing the distortion of main member 221.

The use of D-shaped opening 252 with flat top 296 in slider box main member 221 requires the use of a corresponding D-shaped and sized locking pin 249, which also includes a flat top 298. In this manner, locking pin 249 is able to smoothly engage and retract from opening 252. It should be noted that openings 153 formed in trailer frame mounting rails 141 (FIG. 2) preferably still are round, as flat-top locking pin 249 readily engages and retracts from the round trailer frame rail openings. Alternatively, trailer frame rail openings 153 may also be D-shaped and have a flat top corresponding to slider box main member D-shaped openings 252 and flat-top locking pin 249.

Thus, slider box 220 of the present invention minimizes distortion of slider box main members 221 adjacent the respective tops of D-shaped openings 252. This minimization of distortion of slider box main members 221 helps to ensure smooth selective movement of the slider box main members relative to corresponding trailer mounting rails 141, without the need for substantial post-forming modification, such as grinding of the slider box main member walls at the respective tops of the openings, where distortion occurred in the prior art. As a result, slider box 220 of the present invention enhances the ease of repositioning of the slider box relative to the trailer, thereby increasing one of the advantages associated with the use of slider boxes. In addition, slider box 220 of the present invention enables higher-strength materials to be used for slider box main members 221, thereby potentially increasing the stability and physical characteristics of the slider box.

Figure 7:
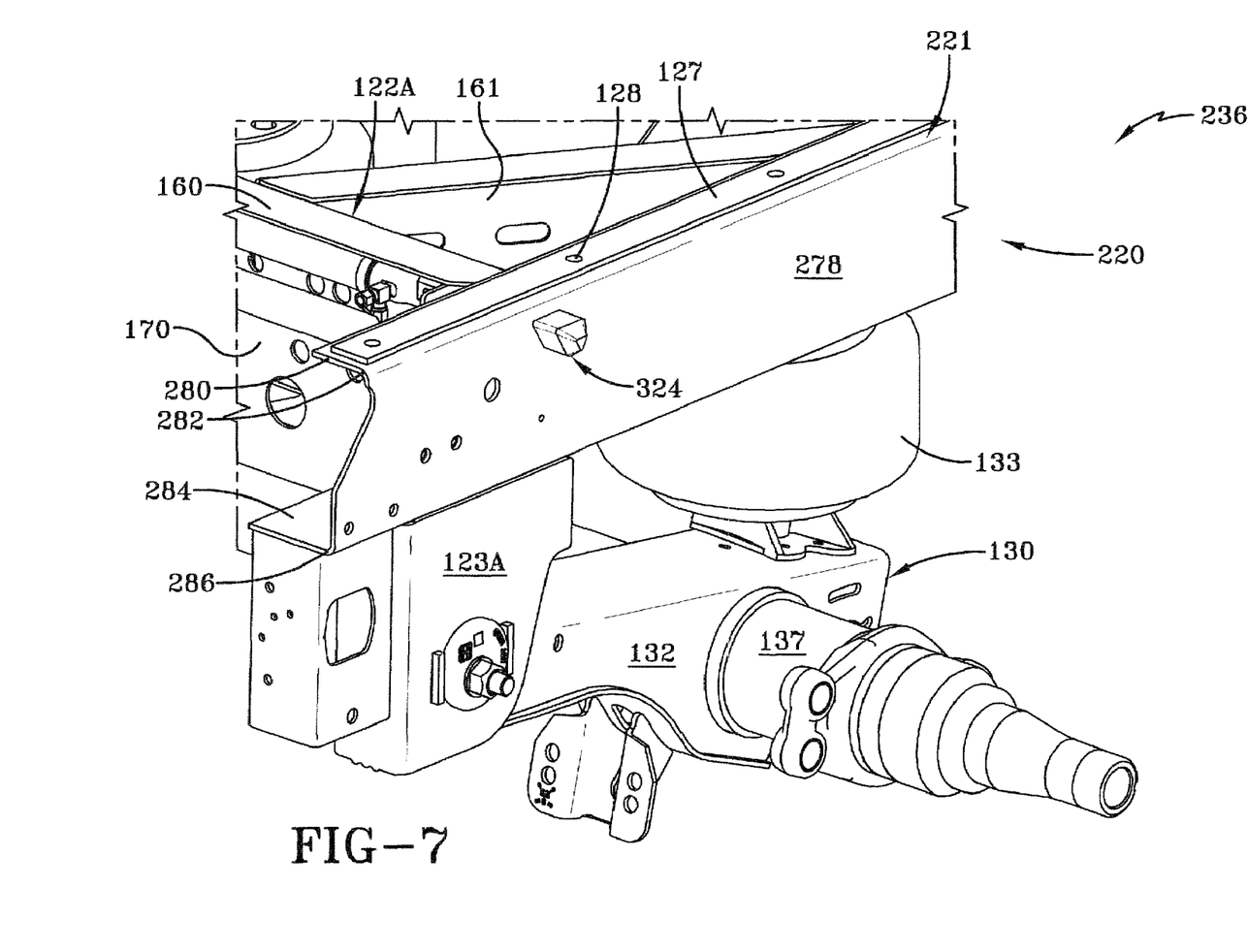
FIG. 7 is a driver's side fragmentary perspective view similar to the one shown in FIG. 5, and showing one of the inverted triangle-shaped main member openings and one of the correspondingly-shaped locking pins of the retractable pin mechanism extending through the main member opening in a locked position.

It is understood that the present invention finds application in all types of slider boxes known to those skilled in the art, including, for example, K-frame slider boxes 120 (FIG. 1), perpendicular-frame slider boxes, and slider boxes having spring suspension systems, or other types of suspension systems than those shown and described herein and known to those skilled in the art, without affecting the concept or operation of the invention. In addition, the present Invention applies to slider boxes that are capable of being outfitted with one, two, three or more axle/suspension systems. The present invention contemplates the use of shapes for the main member opening and pin other than the general D-shape described above. Specifically, other shapes that maintain the location of the main member opening, but increase the distance between the top of the opening and the upper bend of the member, such as an inverted triangle, shown generally in FIG. 7 at 324, may be used without affecting the overall concept or operation of the invention. In addition, the present invention also contemplates other types of retractable pin mechanisms that are well known in the art and are typically used in conjunction with slider boxes.

Accordingly, the improved slider box for tractor-trailers is simplified, provides an effective, safe, inexpensive, and efficient structure which achieves all the enumerated objectives, provides for eliminating difficulties encountered with prior art tractor-trailer slider boxes, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved slider box is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A movable subframe for a tractor-trailer, said subframe being movable longitudinally beneath said tractor-trailer and comprising:
   a pair of transversely spaced-apart main members extending longitudinally relative to said tractor-trailer, each of said main members including a vertically disposed wall, a horizontally-extending upper wall and an upper bend disposed between and connected to said vertically disposed wall and said horizontally-extending upper wall;
   at least one cross member extending between and being attached to said main members; and
   a retractable pin mechanism for selectively positioning said subframe relative to a body of said tractor-trailer, and at least one of said main members being formed with at least one opening for receiving a pin of said retractable pin mechanism, said opening having a horizontally-extending upper portion adjacent said upper bend whereby distortion of the main member adjacent the top of said opening is reduced during formation of said main member.

2. The movable subframe for a tractor-trailer of claim 1, in which said shape of said opening is a D-shape.

3. The movable subframe for a tractor-trailer of claim 2, in which said pin of said retractable pin mechanism includes a D-shape.

4. The movable subframe for a tractor-trailer of claim 1, in which said shape of said opening is an inverted-triangle shape.

5. The movable subframe for a tractor-trailer of claim 4, in which said pin of said retractable pin mechanism includes an inverted-triangle shape.

6. A movable subframe for a tractor-trailer, said subframe being movable longitudinally beneath said tractor-trailer and comprising:
   a pair of transversely spaced-apart main members extending longitudinally relative to said tractor-trailer;
   at least one cross member extending between and being attached to said main members; and
   a retractable pin mechanism for selectively positioning said subframe relative to a body of said tractor-trailer, and at least one of said main members being formed with at least one opening for receiving a pin of said retractable pin mechanism, said opening having a shape whereby distortion of the main member adjacent the top of said opening is reduced during formation of said main member.

7. The movable subframe for a tractor-trailer of claim 6, in which said pin of said retractable pin mechanism includes a D-shape.

8. A movable subframe for a tractor-trailer, said subframe being movable longitudinally beneath said tractor-wailer and comprising:
   a pair of transversely spaced-apart main members extending longitudinally relative to said tractor-trailer;
   at least one cross member extending between and being attached to said main members; and
   a retractable pin mechanism for selectively positioning said subframe relative to a body of said tractor-trailer, and at least one of said main members being formed with at least one opening for receiving a pin of said retractable pin mechanism, said opening having an inverted triangle-shape whereby distortion of the main member adjacent the top of said opening is reduced during formation of said main member.

9. The moveable subframe for a tractor-trailer of claim 8, in which said pin of said retractable pin mechanism includes an inverted triangle-shape.

* * * * *

UNITED STATES PATENT AND TRADEMARK OFFICE
CERTIFICATE OF CORRECTION

PATENT NO.       : 7,503,414 B2
APPLICATION NO.  : 11/476486
DATED            : March 17, 2009
INVENTOR(S)      : Phillippi R. Pierce et al.

It is certified that error appears in the above-identified patent and that said Letters Patent is hereby corrected as shown below:

Claim 6, Column 10, line 32, delete the word "shape" and insert therefor the word --D-shape--.

Claim 8, Column 10, line 40, delete the word "tractor-wailer" and insert therefor the word --tractor-trailer--.

Signed and Sealed this

Nineteenth Day of May, 2009

JOHN DOLL
*Acting Director of the United States Patent and Trademark Office*